May 3, 1966     W. F. SHURTS     3,248,900
ANTI-FRICTION SLIP JOINT
Filed Feb. 13, 1964     2 Sheets-Sheet 1
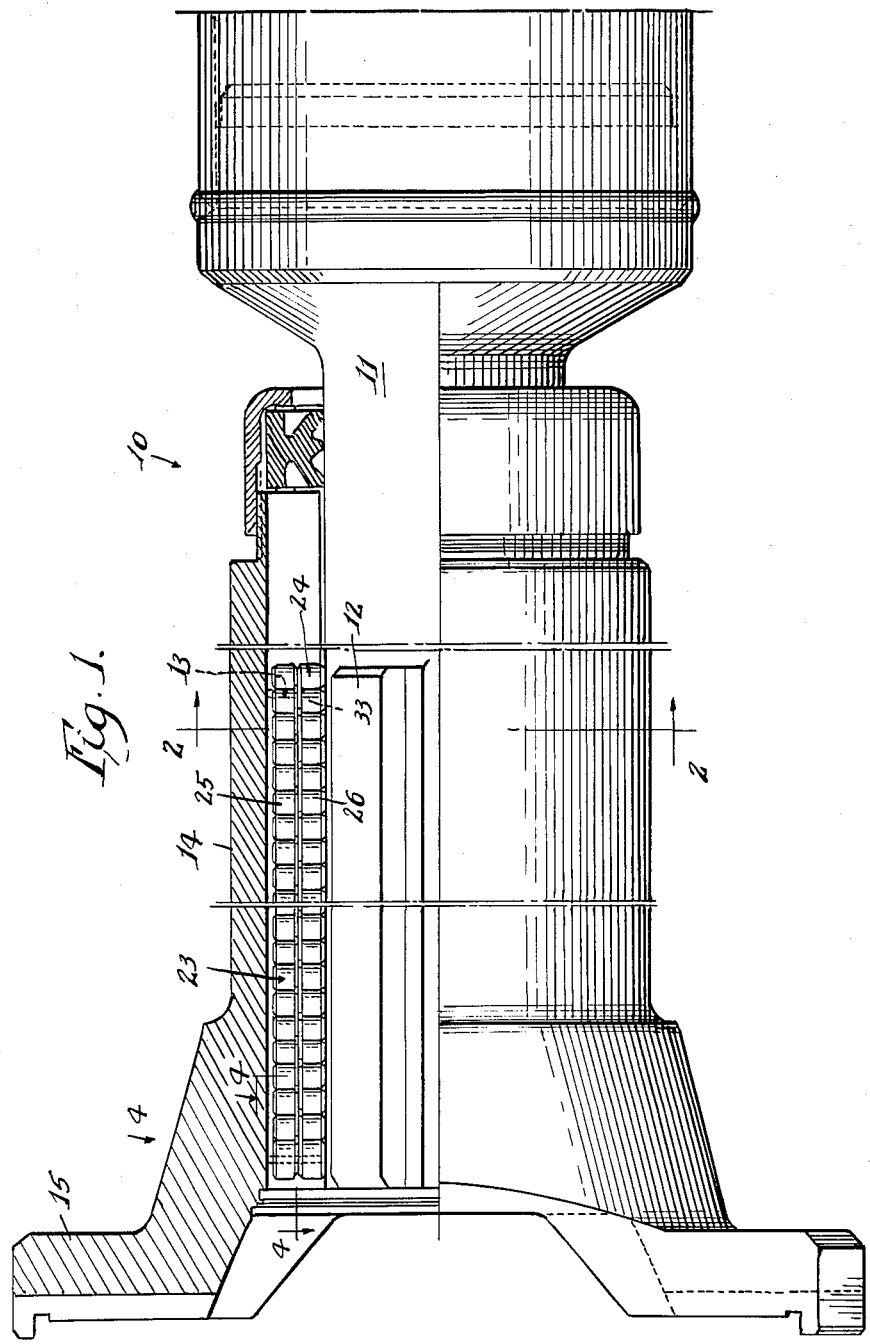
Inventor.
Wilbur F. Shurts.
By [signature]
Attorney.

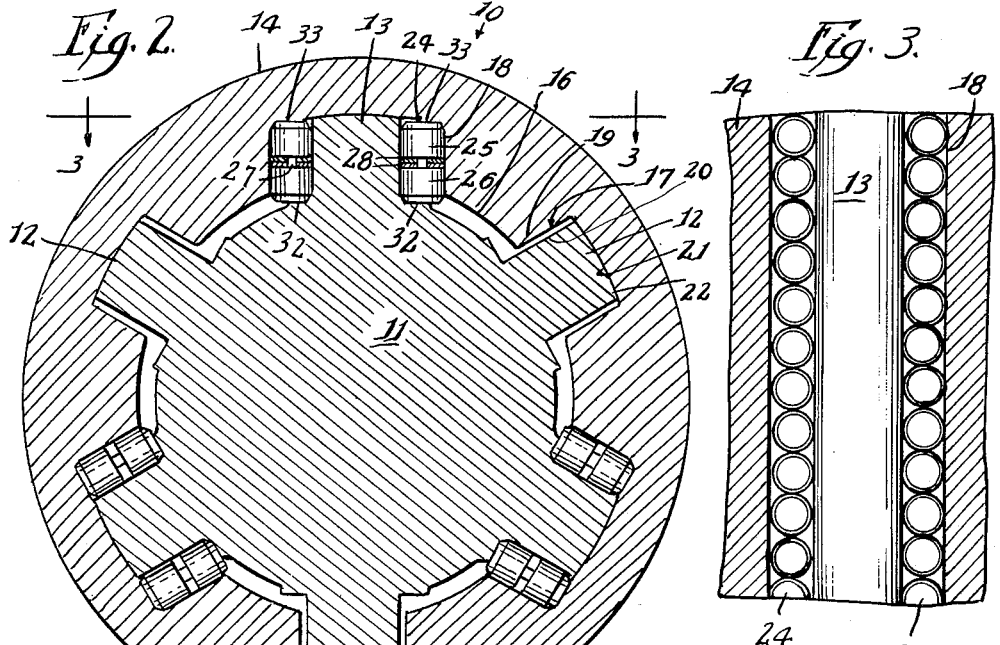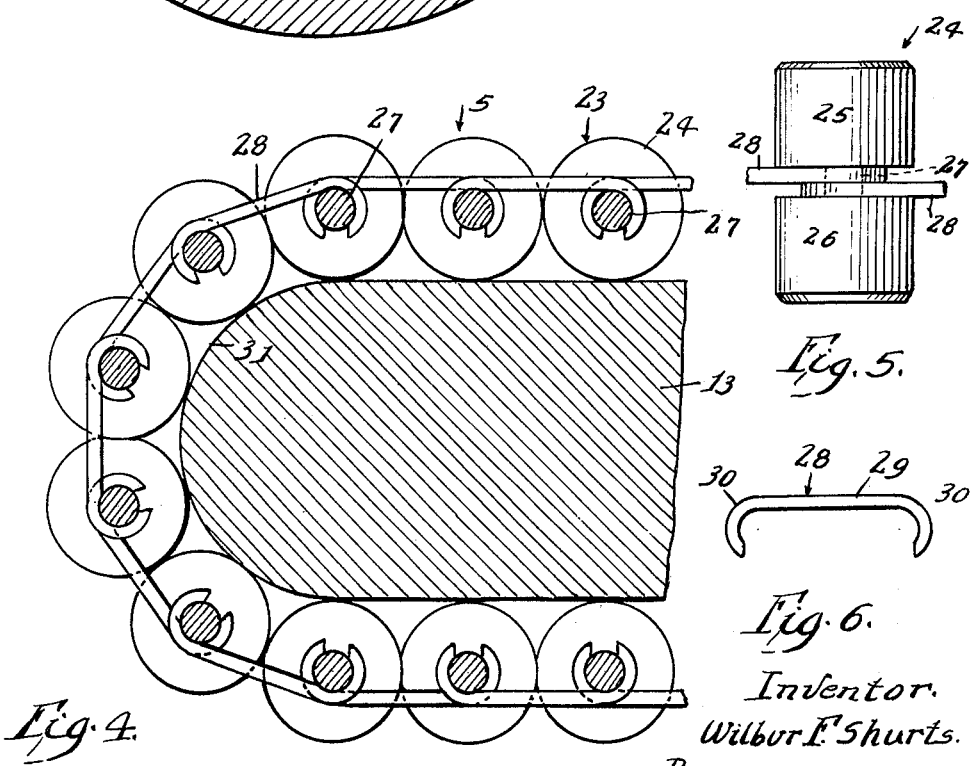

United States Patent Office 3,248,900
Patented May 3, 1966

3,248,900
ANTI-FRICTION SLIP JOINT
Wilbur F. Shurts, Winnebago, Ill., assignor to Twin Disc Clutch Company, Racine, Wis., a corporation of Wisconsin
Filed Feb. 13, 1964, Ser. No. 344,719
2 Claims. (Cl. 64—23)

My invention relates to anti-friction slip joints which provide a connector between driving and driven elements of a power train, such as in universal joint shaft applications where the conditions of operation require a frequent capacity for length changes.

In slip joints generally, simple spline connections between the components thereof have been found to be objectionable under certain circumstances, particularly where a length change occurs during a substantial torque condition. At this time, the overcoming of the static friction between the splines of the joint components by a force acting axially thereof produces a noise which is undesirable. Bearing assemblies composed of balls or needle bearings have heretofore been employed to reduce the friction factor, but they usually require cages or retainers for the anti-friction elements or the design otherwise is such as to result in relatively high fabrication cost.

It is therefore one object of the invention to provide an anti-friction slip joint whose relatively movable components include annularly related, coacting splines circumferentially spaced from each other, certain of the splines on one component having peripheral bearing contact with the other component to prevent tilting or cocking under lateral pressure, and the other splines on said one component being associated with endless bearing assemblies operably related to adjacent splines of said other component.

A further object is to provide a slip joint of the character indicated in which the bearing assembly is composed of a plurality of rollers which are tied together by links and in which a true rolling action is insured by suitable guidance of the ends of the rollers.

In the drawings:

FIG. 1 is an elevation of the anti-friction slip joint, partly in section, and shown for purpose of description only as related to the input of a propeller shaft.

FIGS. 2 and 3 are enlarged sections along the lines 2—2 and 3—3 in FIGS. 1 and 2, respectively.

FIG. 4 is an enlarged, fragmentary section along the line 4—4 in FIG. 1.

FIG. 5 is an elevation of one of the rollers and its associated links as viewed in the direction of the arrow 5 in FIG. 4.

FIG. 6 is an elevation of a link.

Referring to FIG. 1, the numeral 10 designates the assembled, anti-friction slip joint which generally includes relatively movable input and output members which are locked together for rotation. Specifically and for purpose of disclosure only, the shaft 11 will be regarded as the input member and it includes a plurality of radially outward splines circumferentially equispaced therearound and each preferably having the same width. For a reason presently explained, these splines will be regarded as disposed in two sets with the splines in one set alternately related to the splines in the other set. Accordingly, one set will be regarded as composed of alternating splines 12 and the other set of intervening splines 13.

The splined end of the shaft 11 is telescopically received within a sleeve 14, assumed to be the output member of the joint 10, and whose output end 15 may be shaped for connection with a conventional universal assembly (not shown). The sleeve 14 includes a plurality of radially inward splines 16 circumferentially equispaced therearound and between which are formed two sets of grooves with the grooves in one set alternately related to the grooves in the other set, namely, one set being composed of alternating grooves 17 and the other set of intervening grooves 18. The width of each groove 18 is greater than that of each groove 17 for a purpose presently explained.

As shown in FIG. 2, the shaft 11 is spaced from the peripheral surfaces of the splines 16 and there is clearance between the straight sides 19 of the alternate grooves 17 and the like adjacent sides 20 of the splines 12. To prevent relative tilting or cocking of the shaft 11 and the sleeve 14 when subjected to lateral forces, the peripheral surfaces 21 of the alternating splines have bearing contact with the curved bases 22 of the alternating grooves 17.

The anti-friction component of the joint 10 is provided by a plurality of elongated, endless roller bearing assemblies 23, each of which is disposed in straddling relation to a spline 13 and positioned within a groove 18. Specifically, each roller assembly 23 is composed of a plurality of rollers 24 whose axes are parallel to the median radius of the associated spline 13. Each roller 24 is preferably composed of roller components 25 and 26 which are connected by a reduced diameter, coaxial neck 27. One feature of the invention resides in the manner of tying the rollers 24 together for simultaneous movement during periods of relative axial movements of the shaft 11 and sleeve 14 and in such a way as to obviate the necessity for costly cages or retainers, the solution being provided by the use of links 28.

Each link 28 has an elongated shape and includes a straight leg 29 from which extends at its opposite ends, respectively, less than semi-circular portions 30 to facilitate positioning connection with a pair of adjacent necks 27 by a snap-like action. Lengthwise of the bearing assembly 23, the links 28 are successively staggered with respect to each other as shown in FIGS. 4 and 5 and fit easily between the opposed ends of the roller components 25 and 26.

In operation and assuming, for example, a clockwise rotation of the shaft 11 as viewed in FIG. 2, the leading faces of the intervening splines 13 will force the adjacent rollers 24 against the adjacent trailing faces of the splines 16. Having regard to the normal working fit of the rollers 24 between the intervening splines 13 and the splines 16, the rollers 24 on the trailing sides of the intervening splines 13 will be relatively unloaded. Accordingly, when the shaft 11 and sleeve 14 move relatively, the bearing assemblies 23 will move longitudinally along the sides of the splines 13 and around the rounded ends 31 thereof. During such relative movement, it will be apparent that the rollers 24 on one side of the spline 13 will progress in a direction opposite to the rollers on the opposite side of the same spline.

Another feature of the invention is the means provided for insuring true rolling of the rollers 24 by preventing any swerving or skewing thereof. For this purpose, the opposite ends of the rollers 24 are respectively guided by flat surfaces 32—32 provided on the shaft 11 on opposite sides of each intervening spline 13 and by like surfaces 33—33 forming a part of the base of each intervening groove 18 and also positioned on opposite sides of each intervening spline 13. The flat surfaces 32 and 33 are normal to the median radius of the associated intervening spline 13. By maintaining a close tolerance in the spacing of associated pairs of flat surfaces 32 and 33 in conjunction with a close tolerance on the overall length of the rollers 24, each roller will be maintained in its proper position.

I claim:
1. A slip joint comprising a sleeve, a shaft telescopically mounted with the sleeve, the sleeve and shaft including a plurality of radially inward and outward extending splines, respectively, the sleeve splines including therebetween a plurality of grooves equispaced around the sleeve and the shaft splines extending into the grooves, a plurality of endless bearing assemblies carried by the shaft in straddling relation to selected shaft splines for bearing contact with the adjacent sleeve splines, each bearing assembly including a plurality of linked rollers for simultaneous movement along the sides of the associated, selected shaft spline during relative movements of the sleeve and shaft, and the ends of each selected shaft spline being rounded to facilitate movement of the bearing assemblies, each roller including components connected by a cylindrical, coaxial neck having a substantially smaller diameter and the roller components being connected by a progression of links mounted on the necks, the ends of each roller component being guided by flat surfaces respectively provided on the shaft and on the sleeve and forming part of the base of the groove included between the associated sleeve splines.

2. A slip joint as defined in claim 1 wherein said selected shaft splines alternate with respect to said other shaft splines whose peripheral surfaces respectively bear against the bases of the associated sleeve grooves and whose other surfaces are free of contact with the last named grooves.

References Cited by the Examiner

UNITED STATES PATENTS

| | | | |
|---|---|---|---|
| 2,211,881 | 8/1940 | Collett et al. | 64—23.7 |
| 2,723,886 | 11/1955 | Warshaw | 308—6 |
| 2,968,358 | 1/1961 | De Lorean | 64—23 X |
| 2,979,147 | 4/1961 | Naumann | 64—23 X |
| 2,983,120 | 5/1961 | White | 64—23 |
| 3,003,828 | 10/1961 | Stark | 308—6 |

BROUGHTON G. DURHAM, *Primary Examiner.*

H. C. COE, *Assistant Examiner.*